United States Patent [19]
Arai

[11] Patent Number: 5,985,108
[45] Date of Patent: Nov. 16, 1999

[54] CONTROLLING APPARATUS FOR CONTINUOUS ELECTROLYTIC ION WATER PRODUCING APPARATUS

[75] Inventor: Kazuyoshi Arai, Atsugi, Japan

[73] Assignee: Miz Co., Ltd., Japan

[21] Appl. No.: 07/944,281

[22] Filed: Sep. 14, 1992

[30] Foreign Application Priority Data

Oct. 11, 1991 [JP] Japan .................................. 3-290313

[51] Int. Cl.$^6$ .................................................. C02F 1/46
[52] U.S. Cl. ................... 204/228.1; 204/229.3; 204/229.5; 204/229.7; 204/230.6; 204/230.8; 204/661; 205/743
[58] Field of Search ................... 204/305, 306, 204/152, 228

[56] References Cited

U.S. PATENT DOCUMENTS

| | | | |
|---|---|---|---|
| 4,525,253 | 6/1985 | Hayes et al. | 204/149 |
| 4,734,176 | 3/1988 | Zemba, Jr. et al. | 204/149 |
| 4,917,782 | 4/1990 | Davies | 204/306 |
| 4,946,574 | 8/1990 | Lin | 204/229 |
| 5,055,170 | 10/1991 | Saito | 204/228 |
| 5,316,646 | 5/1994 | Arai | 204/306 |

*Primary Examiner*—John F. Niebling
*Assistant Examiner*—Michael S. Lebentritt
*Attorney, Agent, or Firm*—Lorusso & Loud

[57] ABSTRACT

A controlling apparatus which can control a continuous electrolytic ion water producing apparatus so that an excess current when the electrolyzing strength is not adjusted appropriately can be prevented with certainty and harmless electrolytic ion water can be obtained continuously from the continuous electrolytic ion water producing apparatus. When water flows through the electrolytic cell, it is energized by a power source circuit to electrolyze the water to obtain electrolytic ion water. When a range change-over switch is manually operated, a dc voltage of the power source circuit is controlled in response to the range change-over switch by a control unit and a switching regulator to produce an electrolyzing voltage corresponding to the operated position of the range change-over switch. The water is thus electrolyzed with an electrolyzing strength of the electrolyzing voltage. During the electrolyzing operation, the electrolytic current is always detected by a current sensor, and when it exceeds a preset value and an excess current is judged, the pulse width is decreased to automatically decrease the electrolyzing voltage and hence the electrolyzing capacity.

7 Claims, 5 Drawing Sheets

FIG. 6

CONTROLLING APPARATUS FOR CONTINUOUS ELECTROLYTIC ION WATER PRODUCING APPARATUS

BACKGROUND OF THE INVENTION

1. Field of the Invention

This invention relates to a continuous electrolytic ion water producing apparatus which electrolyzes water such as city water to continuously produce alkali ion water and acid ion water, and more particularly to a controlling apparatus which controls a continuous electrolytic ion water producing apparatus of the type mentioned so that an excess current is automatically prevented from flowing to an electrolyzing cell.

2. Description of the Related Art

A continuous electrolytic ion water producing apparatus which applies a dc voltage between a pair of positive and negative electrodes in drinking water such as city water to electrolyze the drinking water to directly produce alkali ion water and acid ion water is already known. Alkali ion water is used to improve the acid condition resulting from modern eating habits depending upon meat and thereby promotes health while acid ion water is used to wash the surface of the human body and for make-up.

The electrolyzing capacity of an electrolytic cell of an electrolytic ion water producing apparatus of the type mentioned, that is, the hydrogen ion exponent (pH) value of electrolytic ion water produced, depends much upon the flow rate through the electrolytic cell, the electric conductivity, temperature and quality of water supplied to the electrolytic cell and so forth. Therefore, a range change-over switch is provided which varies the dc voltage received by a power source circuit to adjust the electrolyzing strength to one of a plurality of stages. Thus, a required PH value of electrolytic ion water can be obtained if a user judges the flow rate and/or the quality of water and selects a suitable range in accordance with that judgment.

The range change-over operation user is sometimes performed in error. In this instance, if the electrolyzing strength is excessively low as a result of the range change-over operation in error, then electrolysis of water supplied may be insufficient, but there is no trouble. However, if the electrolyzing strength is excessively high as a result of the range change-over operation in error while the flow rate is comparatively low or the electric conductivity of water supplied is comparatively high, then an excess current higher than a maximum safe current which is set in advance depending upon the capacity of a power source transformer and some other factor flows, resulting in overheat of the power source transformer, burning of an electric part or the possibility that a human body may be damaged by water produced which has an excessively high PH value. Therefore, a countermeasure for the prevention of an excess current is taken.

Various countermeasures for the prevention of an excess current are conventionally available. One of the conventional countermeasures is to light up an indicator lamp to give a warning to a user in order to urge the user to perform a manual range lowering operation. It is another conventional countermeasure to provide an overheat preventing switch in the form of a bimetal thermo-switch for a power source transformer so that, when an excess current flows, the power supply is interrupted by operation of the switch.

However, with the former countermeasure, the manual range lowering operation is not always performed appropriately by a user, and in some cases, the manual range lowering operation may be performed in response to a warning in such a manner as to excessively decrease the electrolyzing strength beyond a necessary level. On the other hand, with the latter countermeasure, interruption of the power supply results in interruption of production of electrolytic ion water, and therefore, a range change-over operation and passing of water must be performed again from the beginning, resulting in low operability. Accordingly, in such a situation that an excess current flows, it is not possible to prevent such excess current to continuously obtain electrolytic ion water.

SUMMARY OF THE INVENTION

It is an object of the present invention to provide a controlling apparatus which can control a continuous electrolytic ion water producing apparatus so that an excess current when the electrolyzing strength is not adjusted appropriately can be prevented with certainty and harmless electrolytic ion water can be obtained continuously from the continuous electrolytic ion water producing apparatus.

In order to attain the object, according to the present invention, there is provided a controlling apparatus for a continuous electrolytic ion water producing apparatus which includes an electrolytic cell, a pair of negative and positive electrodes accommodated in the electrolytic cell and a power source circuit for applying a dc voltage between the negative and positive electrodes, which comprises a current sensor for detecting an electrolytic current flowing through the electrolytic cell, a range change-over switch for adjusting the electrolyzing strength to one of a plurality of stages, a switching regulator connected in the power source circuit for controlling the dc voltage of the power source circuit and a control unit for setting the pulse width to one of a plurality of stages in response to a signal from the range change-over switch, reducing the thus set pulse width when the electrolytic current detected by the current sensor is an excess current, and delivering a signal of the pulse width thus set or reduced to the switching regulator.

In the control apparatus for a continuous electrolytic ion water producing apparatus, when the electrolytic cell is energized by the power source circuit upon passage of water through the electrolytic cell, the water is electrolyzed in the electrolytic cell to produce electrolytic ion water, which is thus obtained from the continuous electrolytic ion water producing apparatus. If the range change-over switch is manually operated, then the dc supply voltage of the power source circuit is controlled by the control unit and the switching regulator to produce an electrolyzing voltage in accordance with the selected position of the range change-over switch, and the water is thus electrolyzed at the electrolyzing voltage thus produced. Then, during the electrolyzing operation, the electrolytic current is continuously detected by the current sensor, and when the electrolytic current exceeds a preset value and an excess current is judged, the pulse width is decreased to automatically decrease the electrolyzing voltage and hence the electrolyzing capacity.

Thus, with the control apparatus for a continuous electrolytic ion water producing apparatus, since the electrolyzing strength is automatically lowered when an excess current is detected during electrolyzing operation, overheat of the power source transformer, burning of some other electric part and so forth are prevented. Further, since the electrolytic cell is energized with a current lower than the excess current, harmless electrolytic ion water can be obtained continuously and also the operability is enhanced. Because, when an excess current is detected the electrolyzing voltage is lowered to eliminate excess current, the safety is high.

The control unit may include excess current judging means for judging from a signal from the current sensor whether or not the electrolytic current exceeds a preset value, a driver for controlling the switching regulator to switch on and off, oscillating means, and pulse width controlling means for setting the pulse width to one of the plurality of stages in response to a signal from the range change-over switch. The control unit outputs a pulse signal indicative of the pulse width thus set to the driver and decreasing when an excess current is determined by the excess current judging means, the thus set pulse width by one stage in response to a range down signal from the excess current judging means. In this instance, preferably the excess current judging means judges an excess current and outputs a range down signal when the the electrolytic current exceeds the preset value for a maximum safe current continues for more than a fixed period of time and then to its initial state when passage of water is interrupted. Thus, monitoring for excess current is performed each time water is allowed to pass through the electrolytic cell.

Preferably, the control unit causes a range indicator to blink when an excess current is judged. The user thus can readily become aware that a range change-over operation was not appropriate.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
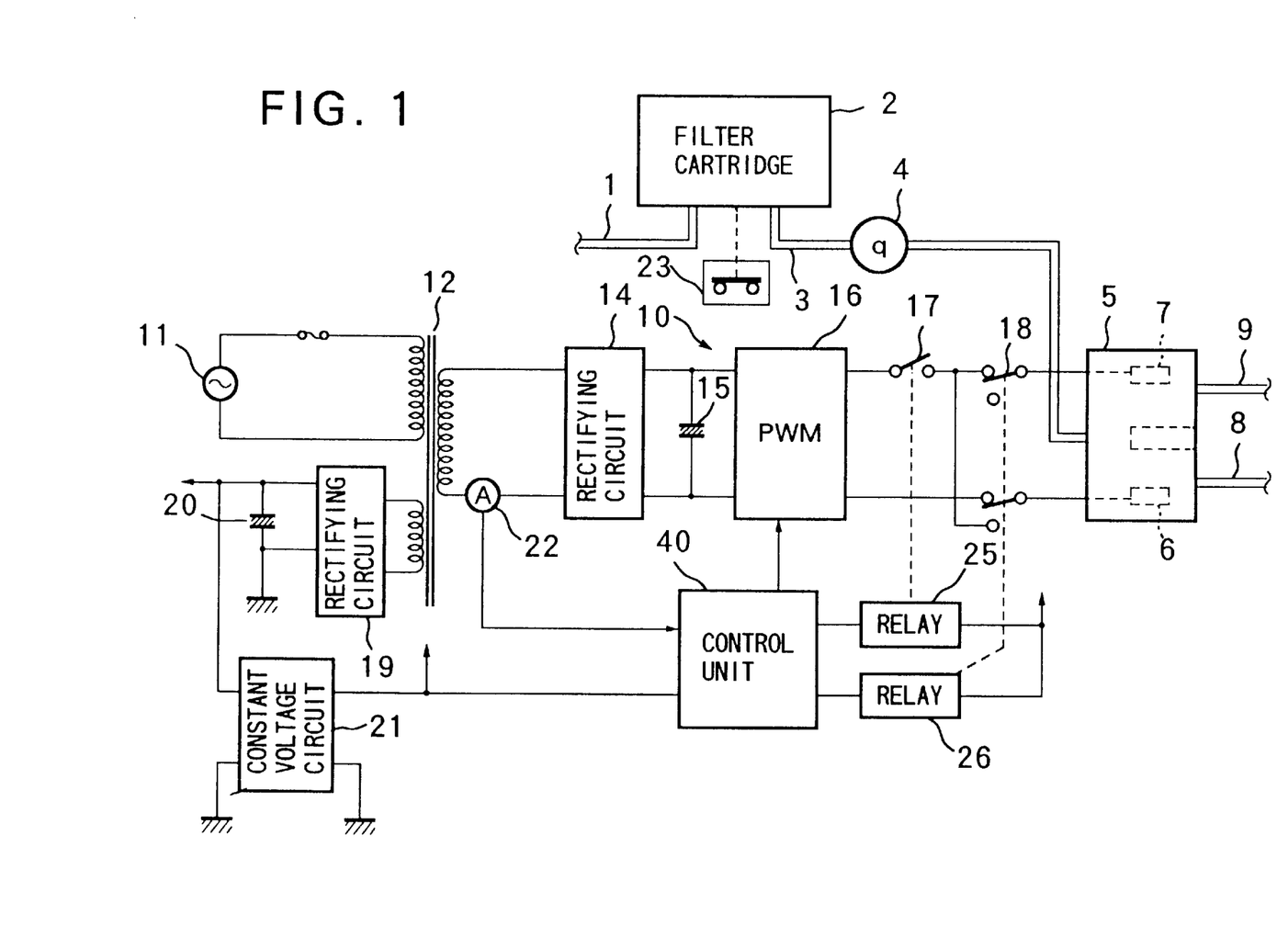
FIG. 1 is a circuit diagram schematically showing a water flow route and a power source circuit of a continuous electrolytic ion producing apparatus in which a control apparatus according to the present invention is incorporated.

Referring first to FIG. 1, there is shown a continuous electrolytic ion water producing apparatus in which a control apparatus according to the present invention is incorporated. The continuous electrolytic ion water producing apparatus shown includes an inlet pipe 1 serving as a water pipe adapted to be connected to a city water pipe or the like to introduce city water into the continuous electrolytic ion water producing apparatus. The inlet pipe 1 communicates with a filter cartridge 2 for removing residual chlorine from the city water introduced thereto. An outlet pipe 3 from the filter cartridge 2 communicates with an electrolytic cell 5 by way of a flow rate sensor 4 of the rotary type interposed between them. The electrolytic cell 5 is of the enclosed type, and the exit side of the interior is partitioned by a partition or the like into two sections in which a negative electrode 6 and a positive electrode 7 are disposed separately. An outlet pipe 8 for alkali ion water is connected to the electrolytic cell 5 adjacent the negative electrode 6 while another outlet pipe 9 for acid ion water is connected to the electrolytic cell 5 adjacent the positive electrode 7 so that alkali ion water and acid ion water can be extracted separately from the output pipes 8 and 9, respectively.

A power source circuit 10 is provided for the electrolytic cell 5 and includes an AC power source 11 connected to the primary winding of a power source transformer 12, a secondary winding of which is connected to a rectifying circuit 14. The positive and negative poles of the DC voltage output side of the rectifying circuit 14 are connected by way of a smoothing capacitor 15 to a switching regulator 16 of the pulse width modulating type (PWM) for controlling the DC in a stepless manner. The outputs of the switching regulator 16 are connected individually to the positive electrode 7 and the negative electrode 6 by way of a power source switch 17 and a polarity reversing switch 18. For controlling power, another secondary winding of the power source transformer 12 is connected by way of another rectifying circuit 19 and another smoothing capacitor 20 to a constant voltage circuit 21, which is connected to a control unit 40 so that a fixed voltage may be supplied to the control unit 40.

Figure 2:
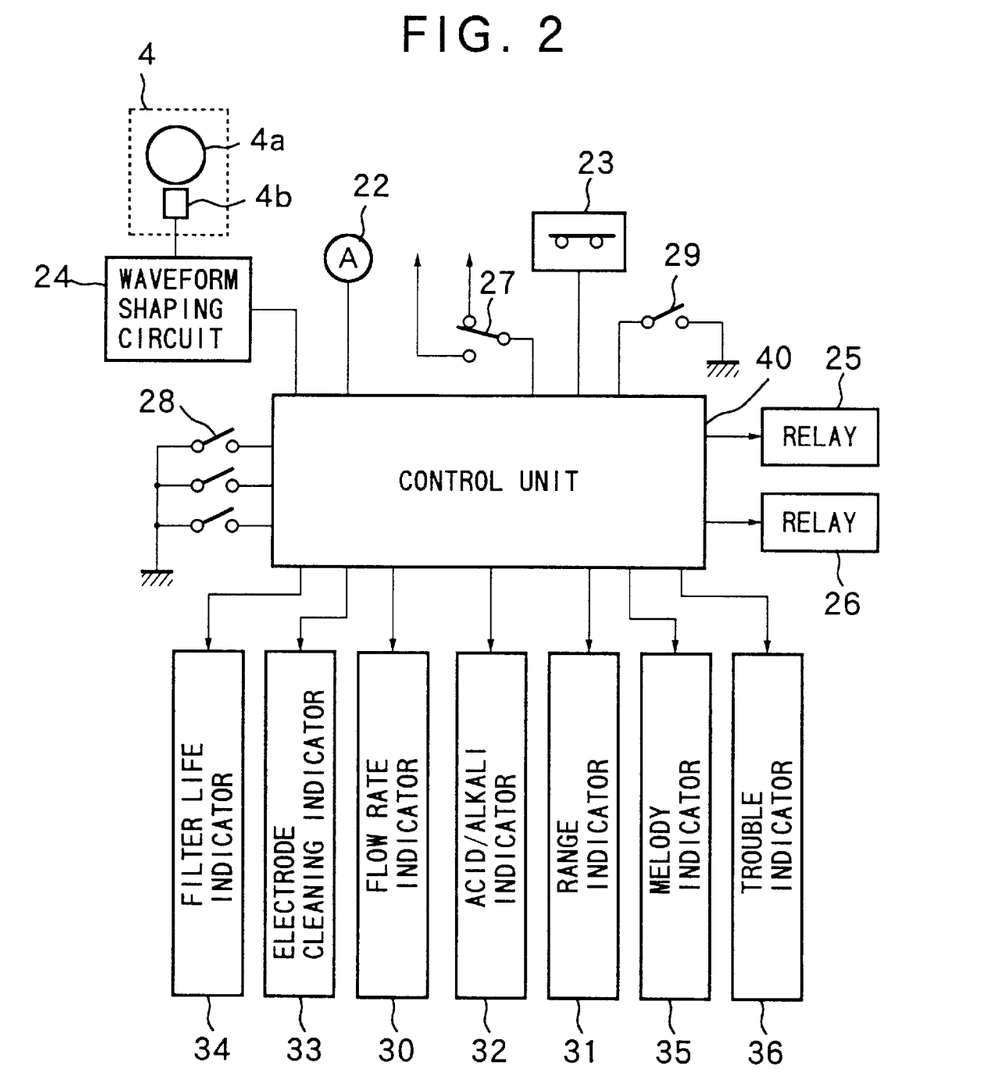
FIG. 2 is a schematic circuit diagram of an electric control system for the continuous electrolytic ion water producing apparatus shown in FIG. 1.

Referring now to FIG. 2, there is shown an electric control system for the continuous electrolytic ion water producing apparatus shown in FIG. 1. Referring also to FIG. 1, a current sensor 22 for detecting an electrolytic current is provided at the secondary winding of the power source transformer 12 connected to the rectifying circuit 14, and an output signal of the current sensor 22 is input to the control unit 40. A reset switch 23 is provided for the filter cartridge 2 and resets upon exchanging of a filter, and a switch signal of the reset switch 23 is input to the control unit 40. The flow rate sensor 4 detects rotation of an electromagnetic vane wheel 4a disposed in the water pipe line by means of a Hall effect element 4b and outputs corresponding pulses. The pulse signal is input to the control unit 40 by way of a waveform shaping circuit 24. The control unit 40 counts pulses of the pulse signal from the flow rate sensor 4 to detect a flow rate of water, and the power source switch 17 is switched on and off by means of a relay 25 in response to the flow rate thus detected. Further, after stopping water flow, a scale removing time is set in accordance with the amount of water passed, and the polarity reversing switch 18 is changed over to the opposite connecting position by means of another relay 26 in accordance with the scale removing time set to automatically remove scale from the positive and negative electrodes 7 and 6.

Further connected to the control unit 40 are an acid-alkali change-over switch 27 which is operated to select acid ion water or alkali ion water a range change-over switch device 28 for adjusting the electrolyzing strength in a stepless manner, and a melody switch 29 which is manually operated when acid ion water is to be used. The electric control system further includes, as indicating means in the form of LEDs (light emitting diodes), a flow rate indicator 30, a range indicator 31, an acid/alkali indicator 32, an electrode cleaning indicator 33 which indicates that scale should be removed, a filter life indicator 34, and a melody indicator 35 which gives a warning to inhibit drinking the water when acid ion water is selected, all connected to the control unit 40.

Figure 3:
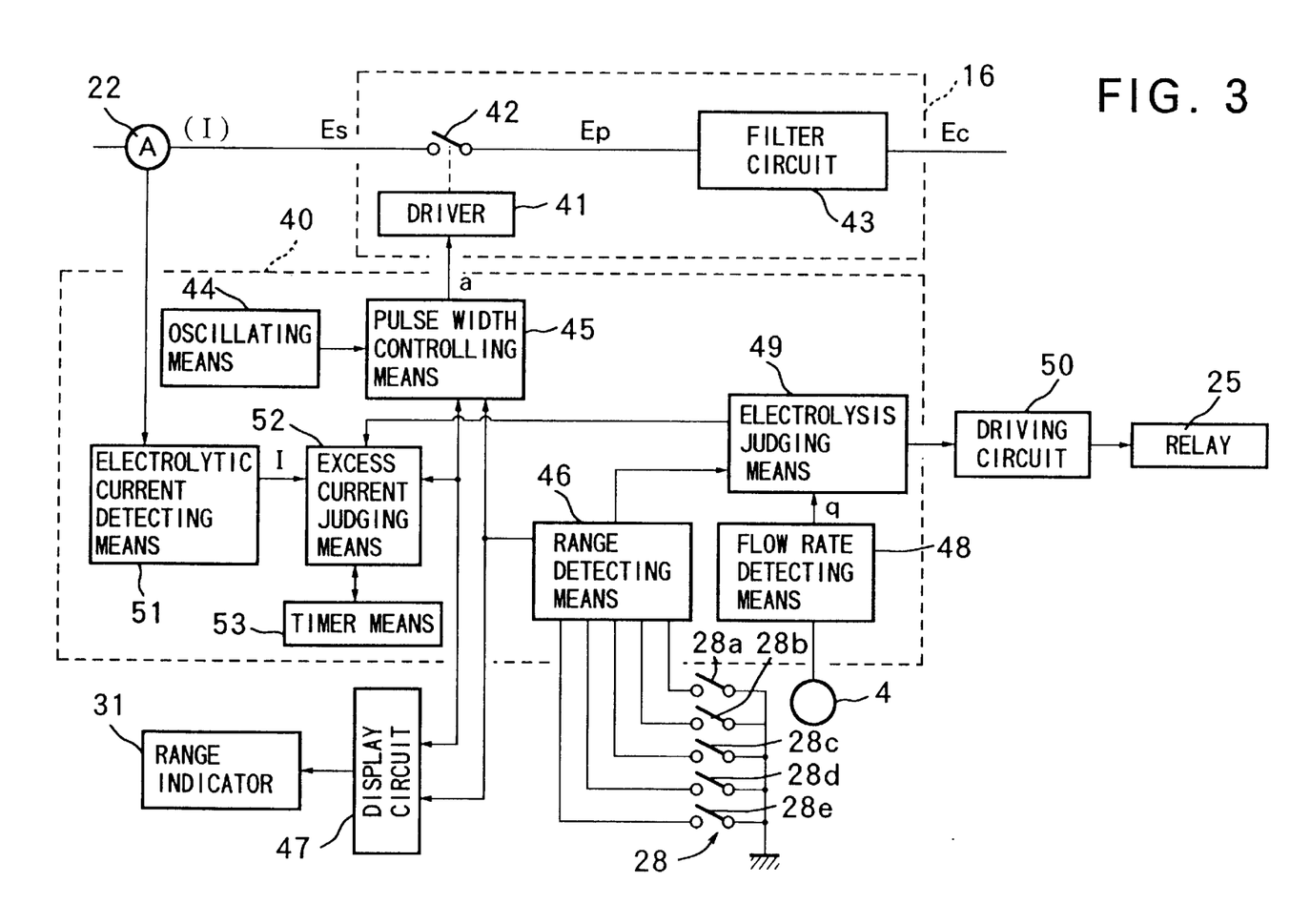
FIG. 3 is a block diagram of the controlling circuit of the control system shown in FIG. 2.

Referring now to FIG. 3, there is shown a control circuit of the electric control system shown in FIG. 2. The current sensor 22 of the control circuit shown may be of the type wherein an electrolytic current is detected in a contactless fashion by means of a magnetic core and a magnetic sensor or an electric current is detected from a voltage drop across a resistor in the circuit. The range change-over switch device 28 includes, for example, five switches 28a, 28b, 28c, 28d and 28e. The range change-over switch device 28 is constructed such that, when set to its non-electrolyzing position, all of the switches 28a to 29e are positioned in their off positions, and when set to an electrolyzing position, the switches 28a to 28e are selectively switched on as the electrolyzing strength is to be increased from its low condition. When the range is changed over, the range change-over switch 28 outputs a signal in accordance with the positions of the switches 28a to 28e. The switching regulator 16 includes a switching element 42 which is turned on and off by a driver 41, and a filter circuit 43 is connected to the switching element 42. The filter circuit 43 smoothes a pulse voltage Ep supplied thereto to produce an electrolyzing voltage Ec corresponding to a pulse width a of the pulse voltage Ep.

Figure 4:
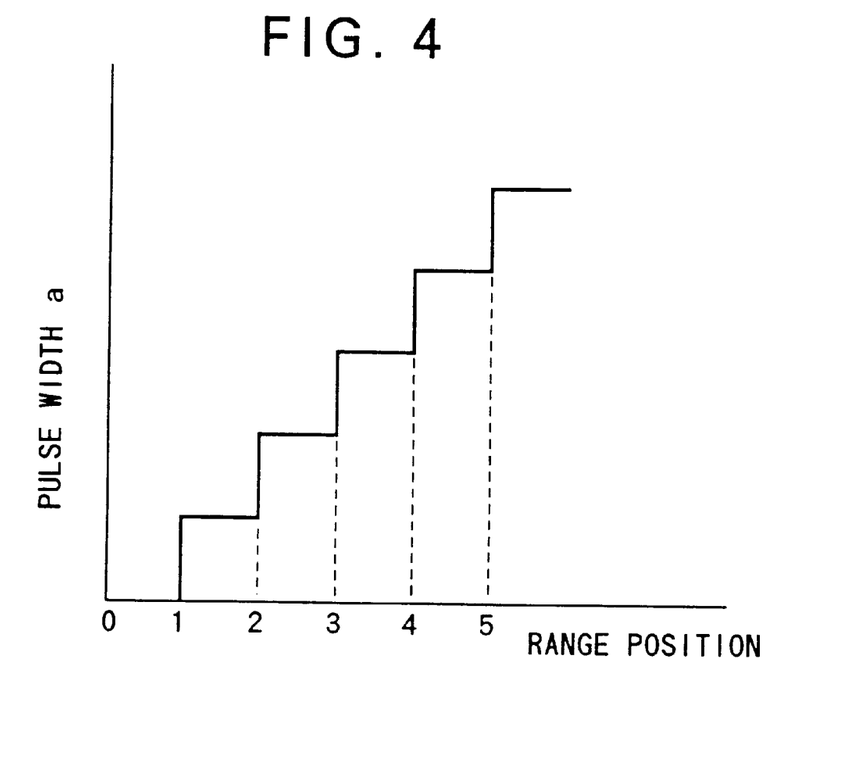
FIG. 4 is a pulse width control map for the pulse width controlling means of the controlling circuit shown in FIG. 3.

The control unit 40 includes range detecting means 46 for receiving a signal from the range change-over switch device 28 and detecting the position of the range change-over switch device 28. The control unit 40 further includes pulse width controlling means 45 for receiving a pulse signal of a predetermined frequency from oscillating means 44. A range signal from the range change-over switch device 28 is input to the pulse width controlling means 45. The pulse width controlling means 45 sets the pulse width a to one of the plurality of stages shown in FIG. 4 in accordance with the present range position of the range change-over switch device 28, and outputs a pulse signal of the pulse width a to the driver 41. The range signal is also input to an indicator circuit 47 to light up the range indicator 31 to indicate the current range position. The control unit 40 further includes flow rate detecting means 48 for receiving a pulse signal from the flow rate sensor 4 and counting the number of pulses of the received pulse signal to detect a flow rate q. The flow rate q and the range signal are input to electrolysis judging means 49, where the flow rate q is compared with a preset reference flow rate. Thus, when the flow rate q is lower than the preset reference flow rate, the electrolysis judging means 49 outputs an off signal to the relay 25 by way of a driving circuit 50. On the other hand, in response to the range signal when the range change-over switch device 28 is at its electrolyzing position in which one of the switches 28a to 28e is at its on position, the electrolysis judging means 47 outputs an on signal to the relay 25 when the flow rate q is equal to or higher than the reference flow rate.

The control unit 40 further includes an excess current preventing control system. The excess current preventing control system includes electrolytic current detecting means 51 for receiving a signal from the current sensor 22 and normally detecting an electrolytic current I flowing through the electrolytic cell 5. The thus detected electrolytic current I is input to excess current judging means 52. The excess current judging means 52 compares the electrolytic current I with a preset value Im of a maximum safe current conforming to the capacity of the power source transformer 12, and operates timer means 53 when the electrolytic current I exceeds the present value Im. When such condition continues for a predetermined period of time, the excess current judging means 52 determines an excess current. Then, the excess current judging means 52 outputs a range down signal to the pulse width controlling means 45 to give an instruction to reduce the pulse width a set with reference to FIG. 4 by one step increments. The range down signal is input also to the indicator circuit 47 so that the range indicator 31 blinks to indicate the signal. Meanwhile, a signal from the electrolytic judging means 49 is input to the excess current judging means 52, and when an off signal is received as a result of interruption of passage of water from the electrolytic judging means 49, the initial state before the judgment is restored by the excess current judging means 52.

In operation, city water is normally introduced into the electrolytic cell 5 by way of the inlet pipe 1. A fixed voltage is supplied to the control unit 40 from the constant voltage circuit 21 connected to the rectifying circuit 19 on the secondary winding side of the power source transformer 12 so that the control unit 40 can execute its control operation. Thus, when neither alkali ion water nor acid ion water is to be used, no pulse signal is input from the flow rate sensor 4 to the control unit 40. Consequently, the electrolysis judging means 49 judges that the electrolyzing operation is at rest and outputs an off signal to the relay 25. Consequently, the power switch 17 is turned off by the relay 25 thereby to deenergize the electrolytic cell 5 so that the non-electrolyzing condition is thereafter maintained.

Then, when water is allowed to pass through the continuous electrolytic ion water producing apparatus, the city water passes through the filter cartridge 2, by which residual chlorine in the city water is removed. Then, the city water flows into the electrolytic cell 5. Thereupon, a pulse signal from the flow rate sensor 4 is input to the control unit 40, at which a flow rate q is detected. Then, in case the range change-over switch 28 is at its non-electrolyzing position in which all of the switches 28a to 28c assume their off positions, a non-electrolyzing operation is determined by the electrolytic judging means 49 similarly as described above. Consequently, the electrolytic cell 5 remains in the non-electrolyzing state. Accordingly, in this instance, the city water, from which chlorine has been removed, is obtained from the continuous electrolytic ion water producing apparatus.

Figure 5:
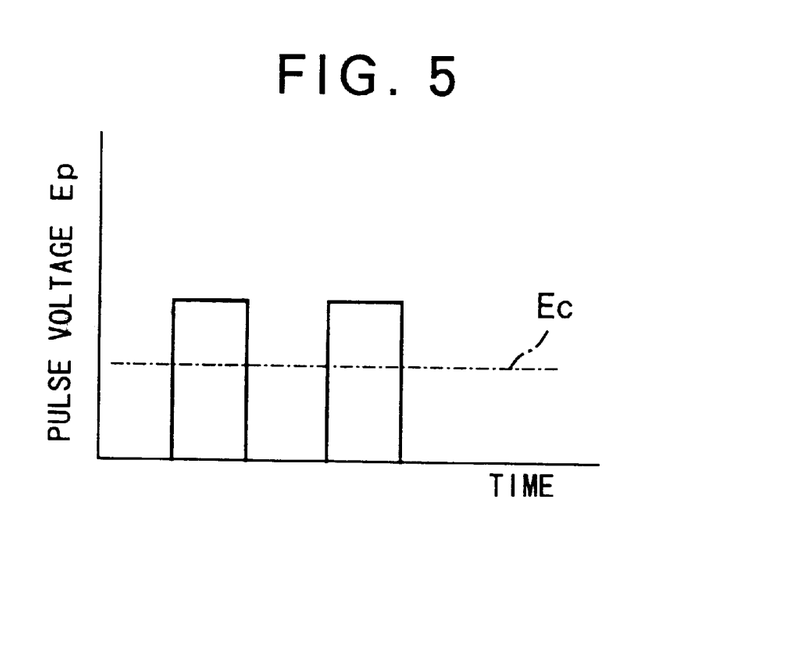
FIG. 5 is a graph showing a pulse voltage produced by the pulse width controlling means.

On the other hand, if, upon passage of water, the range change-over switch 28 is manually moved to one of the electrolyzing strength range positions in accordance with a flow rate, the range signal thereof is then input to the indicator circuit 47 so that an LED of the range indicator 31 corresponding to the selected range position is lit to indicate the range position. Meanwhile, an electrolyzing operation is determined from the range signal by the electrolysis judging means 49, and an on signal is output from the electrolysis judging means 49 to the relay 25 so that the power source switch 17 is switched on by the relay 25. Consequently, the transformed voltage on the secondary winding side of the power source transformer 12 is converted into a DC voltage by the rectifying circuit 14, smoothed by the smoothing capacitor 15 and input to the switching regulator 16. In this instance, the range signal is input also to the pulse width controlling means 45 of the control unit 40, by which a pulse width a is set in accordance with the range signal thus received, and a pulse signal of the pulse width a is output to the driver 41. Consequently, the switching, element 42 of the switching regulator 16 operates to switch on and off in accordance with the pulse width a to produce such a pulse voltage Ep as shown in FIG. 5. The pulse voltage Ep is processed by the filter circuit 43.

Thus, a DC supply voltage Es on the transformer 12 is controlled to a predetermined electrolyzing voltage Ec by way of a pulse voltage Ep in accordance with the position of the range change-over switch device 28. The electrolyzing voltage Ec is applied to the positive electrode 7 and the negative electrode 6 of the electrolytic cell 5 by way of the power source switch 17 and the polarity reversing switch 18 in its regularly connecting position. Consequently, city water in the electrolytic cell 5 is electrolyzed at the electrolyzing voltage Ec. Thus, if the polarity on the electrode side is changed over by the polarity reversing switch 18 to the outlet pipe 8 on the negative electrode 6 side, then alkali ion water containing a comparatively great amount of negative ions therein is obtained, but on the contrary if the polarity is changed over to the outlet pipe 9 on the positive electrode 7 side, then acid ion water containing a comparatively great amount of positive ions therein is obtained.

During such electrolyzing operation, the electrolytic current I supplied to the electrolytic cell 5 as described above is constantly detected by the current sensor 22. The electrolytic current I thus detected is input to the excess current judging means 52, by which it is judged whether or not an excess current is flowing. In case the electrolyzing current I is smaller than its maximum safe current and accordingly is safe, the electrolyzing condition conforming to the positioned of the range change-over switch device 28 is maintained and a predetermined PH value of electrolytic ion water is obtained.

Figure 6:
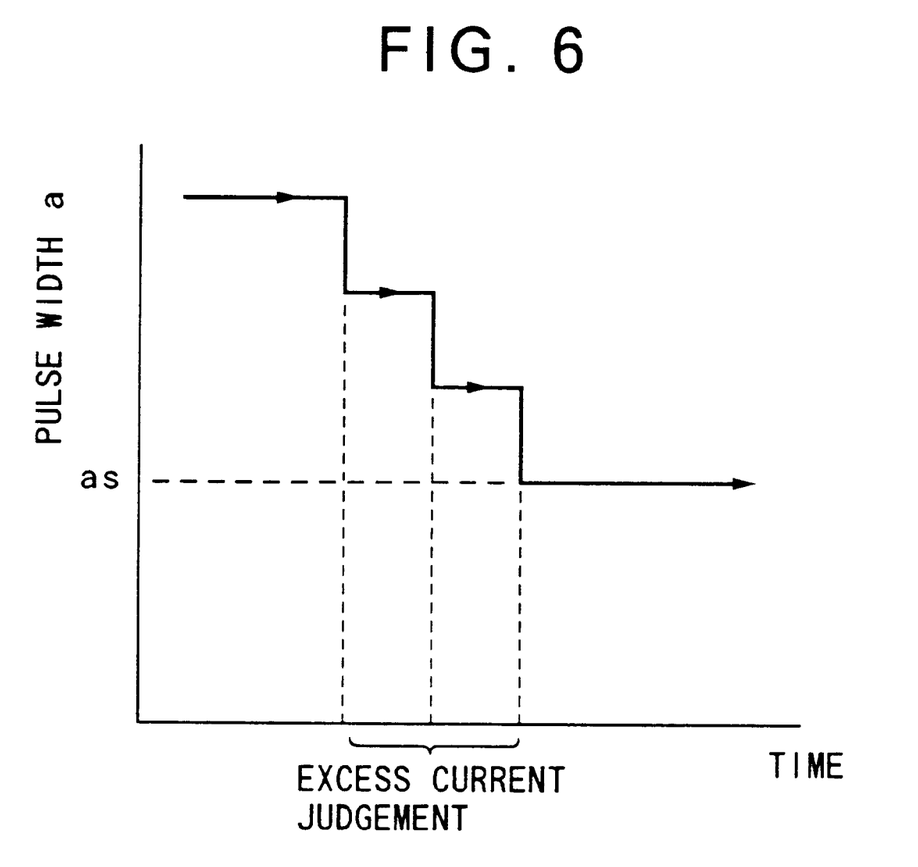
FIG. 6 is a graph illustrating operation of the controlling circuit of FIG. 3 when an excess current is determined.

On the other hand, when the flow rate is comparatively low or when the range change-over switch device 28 is positioned a very high electrolyzing strength while the electric conductivity of water is high due to its comparatively high temperature, then the pulse width a is set comparatively large so that the electrolyzing voltage Ec is controlled to a comparatively high value. Consequently, very high electrolyzing voltage Ec is applied to the electrolytic cell 5 while the resistance of water in the electrolytic cell 5 is low, and as a result, a large amount of electrolytic current I flows through the electrolytic cell 5. Then, when the electrolytic current I exceeds the preset value Im of the maximum safe current and this condition continues for more than the predetermined period of time, an excess current is determined by the excess current judging means 52. Thus, a range down signal is input from the excess current judging means 52 to the pulse width control means 45, by which the pulse width a is lowered by one step increments as seen in FIG. 6 so that the electrolyzing strength is automatically decreased. In this instance, as long as the determination of an excess current continues, the pulse width a is thereafter reduced in one step increments until it reaches steady state as at a point of time when the determination of an excess current is cancelled. Consequently, water is electrolyzed with an electrolyzing strength conforming to the pulse width. In this manner, the electrolytic current I is compulsorily controlled to a level below the maximum safe current, thereby preventing overheat of the power source transformer and so forth.

Further, in this instance, the electrolytic cell 5 is continuously energized while the electrolyzing strength is controlled at a lower level as described above, and electrolytic ion water of a harmless PH value is obtained regularly. Meanwhile, the range down signal is input to the indicator circuit 47 so that the range indicator 31 effects a blinking indication to let the user know a control condition of decreasing electrolyzing strength. Then, when the passage of water is interrupted, the power source switch 17 is switched off by way of the relay 25 by the electrolysis judging means 49 to deenergize the electrolytic cell 5 to convert to a non-electrolyzing condition. Consequently, operation of the excess current judging means 52 is stopped, and consequently, output of the range down signal is cut and the initial condition is restored so that next judgment for an excess current is thereafter performed again.

Having now fully described the invention, it will be apparent to one of ordinary skill in the art that many changes and modifications can be made thereto without departing from the spirit and scope of the invention as set forth herein.

What is claimed is:

1. A control apparatus for controlling a continuous electrolytic ion water producing apparatus which includes an electrolytic cell and a pair of negative and positive electrodes accommodated in the electrolytic cell, the control apparatus comprising:

a power source circuit for applying a DC voltage across the positive and negative electrodes;

a current sensor for detecting electrolytic current passing between the positive and negative electrodes;

a range change-over switch for selecting one of a plurality of stages for the voltage applied across the positive and negative electrodes;

a switching regulator, within said power source circuit, for controlling the DC voltage applied by the power source circuit responsive to a pulse width signal; and a control unit for setting a pulse width corresponding to the selected voltage stage, in response to a signal from said range change-over switch, for comparing the detected current with a predetermined maximum safe value for current to determine a current exceeding the maximum safe value, for reducing the thus set pulse width when the detected current is determined to exceed the maximum safe value for a predetermined duration of time and for delivering a signal for the reduced pulse width to said switching regulator.

2. A control apparatus according to claim 1 wherein said control unit resets to its state prior to determination of an excessive current responsive to interruption of operation of the power source circuit.

3. A control apparatus according to claim 1 wherein said switching regulator includes a switching element, connected between said power source circuit and a line interconnecting the positive and negative electrodes, for switching continuity of said line on and off in response to said pulse width signal to output a control voltage, and a filter circuit for smoothing the control voltage from said switching element.

4. A control apparatus according to claim 1 wherein said control unit delivers a signal for the set pulse width to said switching regulator when the detected current is lower than the predetermined maximum safe value for current.

5. A control apparatus for controlling a continuous electrolytic ion water producing apparatus which includes an electrolytic cell and a pair of positive and negative electrodes accommodated in the electrolytic cell, the control apparatus comprising:

a power source circuit for applying a DC voltage across the negative and positive electrodes;

a current sensor for detecting current flowing between the positive and negative electrodes;

a range change-over switch for selecting one of a plurality of stages for the voltage applied across the positive and negative electrodes;

a switching regulator, within said power source circuit, for controlling the DC voltage applied by the power source circuit;

excess current judging means, connected to said power source circuit, said current sensor, said range change-over circuit and said switching regulator, for outputting to said switching regulator a pulse width signal corresponding to said selected one voltage stage, for comparing the detected current value with a predetermined maximum safe current value and, when the detected current value is higher than the maximum safe current value, outputting a signal representative of excess current;

timer means for computing time elapsed from initial determination of detected current exceeding the predetermined maximum safe current value;

said excess current judging means outputting said signal representative of excess current when said elapsed time reaches a predetermined time; and pulse width control means, connected to said excess current judging means, for reducing the pulse width signal to said switching regulator, responsive to the signal representative of excess current.

6. A control apparatus for control a continuous electrolytic ion water producing apparatus which includes an electrolytic cell and a pair of positive and negative electrodes accommodated in the electrolytic cell, the control apparatus comprising:

a power source circuit for applying a DC voltage across the negative and positive electrodes;

a current sensor for detecting current flowing between the positive and negative electrodes;

a range change-over switch for selecting one of a plurality of stages for the voltage applied across the positive and negative electrodes;

a switching regulator, within said power source circuit, for controlling the DC voltage applied by the power source circuit;

excess current judging means, connected to said power source circuit, said current sensor, said range change-over circuit and said switching regulator, for outputting to said switching regulator a pulse width signal corresponding to said selected one voltage stage, for comparing the detected current with a predetermined maximum safe current and when the detected current is higher than the maximum safe current for a predetermined duration of time, outputting a signal representative of excess current;

a control unit for setting a pulse width corresponding to the selected voltage stage in response to a signal from said range change-over switch, for determining if the detected current is excessive by comparing the detected current with a predetermined maximum safe value for current, for reducing the thus set pulse width when the detected current is determined to be excessive for a predetermined duration of time and for delivering a signal for the reduced pulse width to said switching regulator; and a range indicator, connected to said range change-over switch and said control unit, for indicating the pulse width signal output to said switching regulator.

7. A control apparatus according to claim 6, wherein said range indicator comprises at least one light emitting element which blinks responsive to a determination that the detected current is excessive.

* * * * *

UNITED STATES PATENT AND TRADEMARK OFFICE
CERTIFICATE OF CORRECTION

PATENT NO. : 5,985,108
DATED : November 16, 1999
INVENTOR(S) : Kazuyoshi ARAI

It is certified that error appears in the above-identified patent and that said Letters Patent is hereby corrected as shown below:

Col. 1, line 39, delete "user";
    line 42, after "of" insert --the--;
    line 44, after "is" insert --set-- and delete "the range";
    line 45, delete "change-over operation in";
    line 53, delete "a" insert --the--;
    line 55, after "sure" insert --must be adapted-- and delete "is taken";
    line 60, delete "It is another" insert --Another--.

Col. 2, line 7, delete "passing of water" insert --water flow starting--;
    line 8, delete ", resulting in low operability";
    line 9, delete "such a situation that an" and insert --the case of";
    line 15, delete "controlling" insert --control--;
    line 22, after "the" insert --foregoing--; and
    line 23, delete "controlling" insert --control--.

UNITED STATES PATENT AND TRADEMARK OFFICE
CERTIFICATE OF CORRECTION

PATENT NO. : 5,985,108
DATED : November 16, 1999
INVENTOR(S) : Kazuyoshi ARAI It is certified that error appears in the above-identified patent and that said Letters Patent is hereby corrected as shown below:

Col. 4, line 53, after "water" insert a comma --,--.
Col. 7, line 20, "tioned" should read --tion--; and
       line 25, before "a" insert --for--.
Col. 9, line 16, delete "control" and insert --controlling--.

Signed and Sealed this

Twenty-second Day of May, 2001

Attest:

NICHOLAS P. GODICI

Attesting Officer   Acting Director of the United States Patent and Trademark Office